Nov. 4, 1941. M. GERENDÁS 2,261,360
DEVICE FOR THE PROTECTION OF TREES AND THE LIKE
AGAINST INSECTS AND CATERPILLARS
Filed Feb. 14, 1939

Inventor,
M. Gerendás

By: Glascock Downing & Seebold
Attys.

Patented Nov. 4, 1941

2,261,360

UNITED STATES PATENT OFFICE 2,261,360

DEVICE FOR THE PROTECTION OF TREES AND THE LIKE AGAINST INSECTS AND CATERPILLARS

Miksa Gerendás, Budapest, Hungary

Application February 14, 1939, Serial No. 256,385
In Hungary November 17, 1938

1 Claim. (Cl. 43—108)

The present invention relates to a device for the protection of trees or other plants having a trunk against caterpillars, insects or the like and more particularly to a gas bell fastened on the stem of the tree and preventing the said noxious animals from creeping to the crown of the trees.

Many such tree protectors are already known, but they are all expensive and unreliable, and such a tree protector cannot be sold in great quantities if it cannot be manufactured at very low costs. So the main object of the invention is to provide a reliable tree protector which can be put to market at a very low price.

Another object of the invention is to construct the gas bell in such a way that it can be put onto the tree very quickly, easily, and without the necessity of using expensive tools, whereby the bell should tightly fit on the tree in order to prevent its gas contents from escaping.

With these objects in view, according to the invention the tree protector is made substantially of two parts only, i. e. a packing ring and a bell, in such a way that the packing ring consists of a soft, elastic material, for instance rubber and the bell is made of a thin, gastight and flexible material, for instance impregnated paper or of very thin sheet metal, in order to attain that this bell is able to alter its shape according to the shape of the tree. This is important, as many of the trees are irregular or oval in their cross section. Now, the said elastic ring is put onto the stem at a convenient place, the suitably shaped plate for the bell is put around the tree above the ring and its edges are united to form the bell, whereupon the bell is pulled onto the ring in such a way that it presses the ring to the stem of the tree and hangs on this ring. In such a way it is attained that neither between the ring and the trunk, nor between the ring and the bell any opening is present, so that the interior of the bell is tightly closed at its narrower end, and gases or vapors which may be generated in the bell in any desired manner, remain in the same.

Of course, it is preferable to employ gases or vapors which are lighter than the air, in order to attain that they remain in the bell.

The invention is clearly illustrated in the accompanying drawing, in which.

Figure 1:
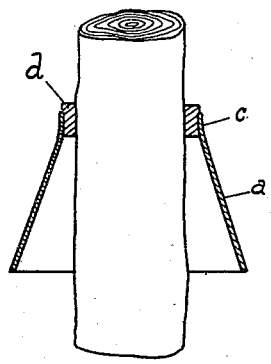
Fig. 1 is a sectional view of one embodiment of the invention.
Figure 2:
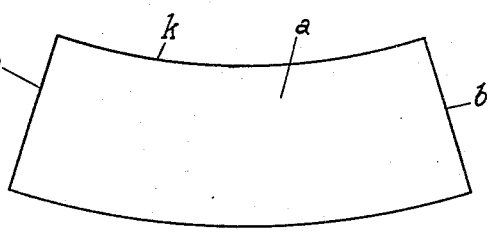
Fig. 2 is a plan view of the bell member shown in Fig. 1.

The bell $a$ (Fig. 1) is made of sheet-metal, artificial substances, varnished pasteboard or the like. The bell is sold in the spread form according to Fig. 2 and the user can cut off a piece of one of the edges $b$ if necessary in order to be able to fasten the upper edge $k$ around the stem of the tree. To this end one of the edges $b$ is provided with a suitable fastening means in order to render possible the uniting of both edges $b$. If the bell is made of pasteboard one or both of the edges $b$ are coated with an adhesive.

Figure 5:
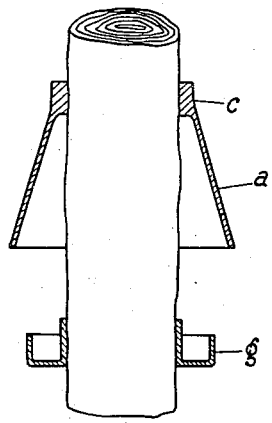

The narrower edge $c$ of the bell $a$ can be fastened on the stem of the tree directly if this edge is sufficiently soft or elastic to seal the bell. It is, however, more preferable to employ a ring $d$ for fixing the bell, which is made of an elastic or of a soft and well fitting material for instance of unvulcanized rubber. This material is preferably sold in the shape of a ribbon, so that the user, after cutting a corresponding piece thereof, puts the same around the stem of the tree and sticks both ends together. The ring $d$ can also be made integral with the bell, for example if the bell is made of rubber (Fig. 5).

The inner surface of the bell formed in this way can be coated with the insecticide material preferably a non-drying, sticky substance, for instance wheel-grease mixed with carbolic acid or nicotine.

Figure 3:
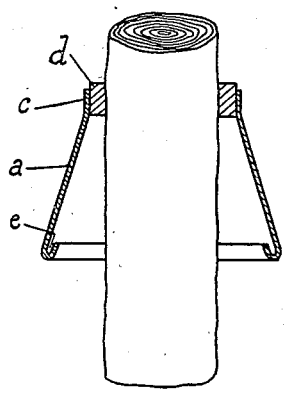
Figs. 3, 4, 5 and 6 are sectional views of further modifications of the invention.

The embodiment according to Fig. 3 differs from the former one only in that the lower edge of the bell is bent inwards, by which a circular channel $e$ is formed which may contain the insecticide material. Into the channel $e$ a material is put, from which gases and/or vapors are produced, which are lighter than the air and thus they are collected in the bell.

Figure 4:
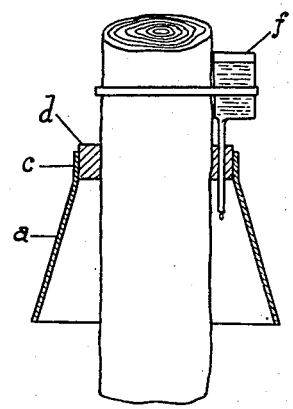

In the embodiment according to Fig. 4 above the bell $a$ a bottle $f$ is fastened, the mouth thereof projecting through the ring into the bell being so tight that the insecticide substance, for instance raw nicotine or carbolic acid contained therein flows out very slowly therefrom. The gases and vapors produced by these substances are also lighter than the air and therefore, they are collected in the bell.

In the embodiment according to Fig. 5 a trough $g$ surrounding the stem is fastened under the bell, into which the materials are put which produce the insecticide light gases and/or vapors mounting into the bell. These materials may be put also into a container arranged in the interior of the bell.

Figure 6:
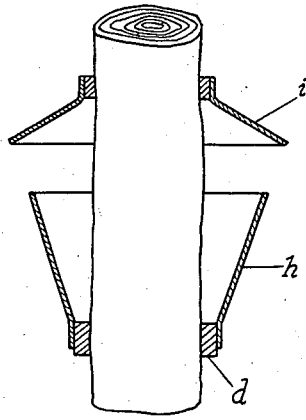

In the embodiment according to Fig. 6 the bell $h$ is fastened on the stem of the tree in a reversed position that is with its narrower part downwards. In this embodiment a material is introduced into the bell, the insecticide gases and/or vapors of which are heavier than the air and thus they float in the bell. In this embodiment a shield $i$ is to be fastened above the bell $h$, which protects the interior of the bell $h$ against rain and the like.

I claim:

In a device for protecting trees and other plants having a trunk against noxious insects, caterpillars or the like; a ring surrounding the trunk and composed of a soft elastic material; a gastight bell having its top end narrow and open and formed from a sheet having the shape of a developed cone; the bell being engaged with said ring in such manner as to press the said ring to the trunk to provide a tight closure at its narrower end and being arranged to hang from the ring; and a layer on the inside of said bell adapted to generate insecticide gases lighter than air in the interior of the bell to keep off the said noxious insects from the crown of the plant.

MIKSA GERENDÁS.